United States Patent
Reichl et al.

(10) Patent No.: US 6,412,182 B1
(45) Date of Patent: Jul. 2, 2002

(54) MEASURING DEVICE FOR CONTACTLESS DETECTION OF A ROTATIONAL ANGLE

(75) Inventors: Asta Reichl, Stuttgart; Thomas Klotzbuecher, Rudersberg; Michael Stoeve, Hirschaid, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,565
(22) PCT Filed: Dec. 1, 1998
(86) PCT No.: PCT/DE98/03525
§ 371 (c)(1),
(2), (4) Date: Oct. 21, 1999
(87) PCT Pub. No.: WO99/30113
PCT Pub. Date: Jun. 17, 1999

(30) Foreign Application Priority Data

Dec. 4, 1997 (DE) .......................... 197 53 775
Sep. 29, 1998 (DE) ....................... 298 17 399 U

(51) Int. Cl.⁷ .................................................. G01B 7/30
(52) U.S. Cl. ........................................ 33/1 PT; 33/708
(58) Field of Search .............................. 33/1 N, 1 PT, 33/706, 708; 318/605

(56) References Cited

U.S. PATENT DOCUMENTS

| | | | | |
|---|---|---|---|---|
| 2,680,241 A | * | 6/1954 | Gridley ...................... 33/1 PT |
| 2,944,157 A | * | 7/1960 | McAusian et al. .......... 33/1 PT |
| 4,072,893 A | * | 2/1978 | Huwyler ..................... 33/1 PT |
| 4,495,700 A | * | 1/1985 | Ernst ............................ 33/1 N |
| 5,375,333 A | * | 12/1994 | Hecht et al. ................. 33/1 N |
| 5,446,966 A | * | 9/1995 | Ishizaki ....................... 318/605 |
| 6,185,829 B1 | * | 2/2000 | Geisel .......................... 33/706 |
| 6,163,974 A | * | 12/2000 | Masek et al. ................. 33/706 |

FOREIGN PATENT DOCUMENTS

| | | |
|---|---|---|
| DE | 196 34 281 A1 | 2/1998 |
| EP | 0 611 951 A | 8/1994 |

* cited by examiner

Primary Examiner—G. Bradley Bennett
(74) Attorney, Agent, or Firm—Michael J. Striker

(57) ABSTRACT

A measuring device for contactless detection of an angle of rotation is comprised of a supporting plate (14) made of soft magnetic material which is used as a rotor. In a plane in relation to the supporting plate (14), two segments (16, 17) are disposed, which are separated by means of a slot (21) and a spacer gap (22). The supporting plate (14) is fastened to an axle (11) whose extension (12) or the axle (11) itself is comprised of a magnetically conductive material. The extension (12) protrudes into one of the segments (16) of the stator. The axle (11), particularly its extension (12), the supporting element (14), and the segments (16, 17) control the magnetic flux of the permanent magnet (15) disposed on the supporting plate (14). Through the inclusion of the axle (11) into the magnetic flux, the measuring device is constructed in a relatively simple and space-saving manner.

25 Claims, 6 Drawing Sheets

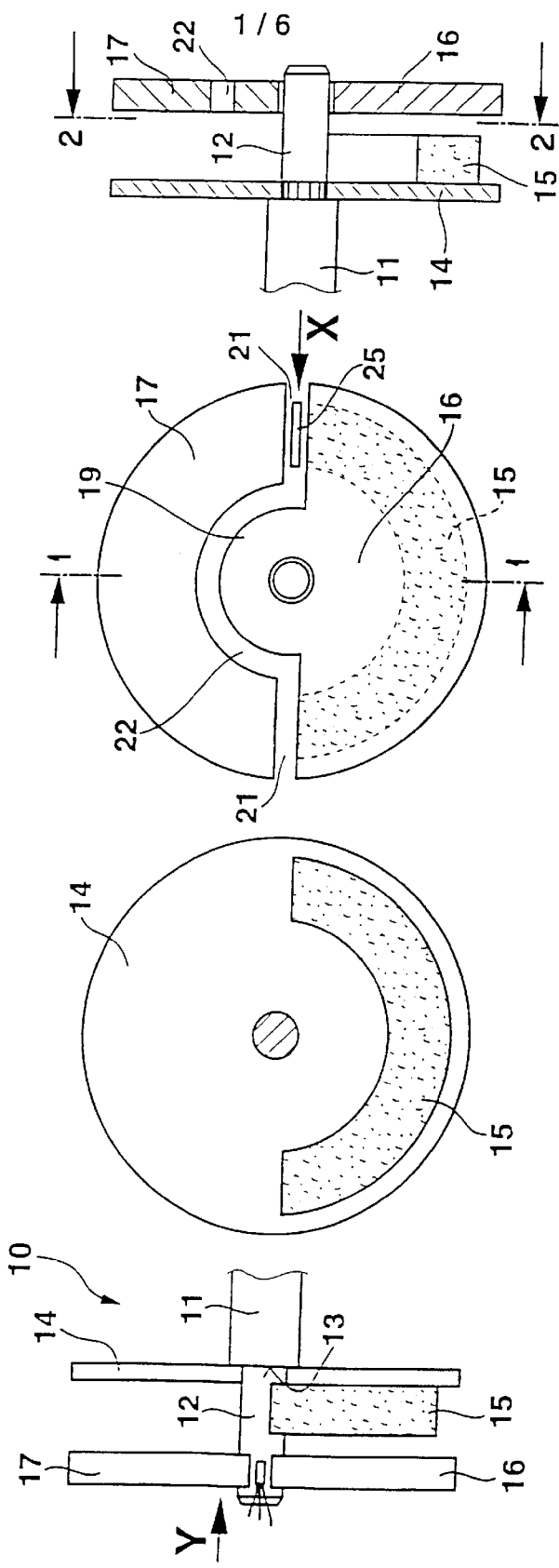

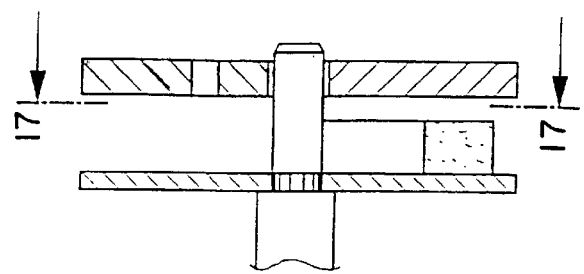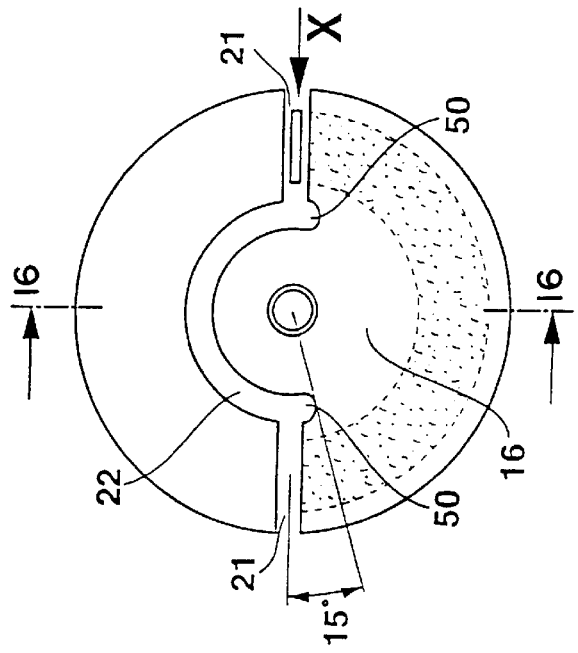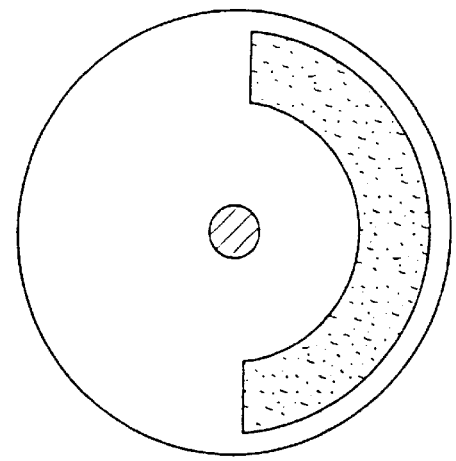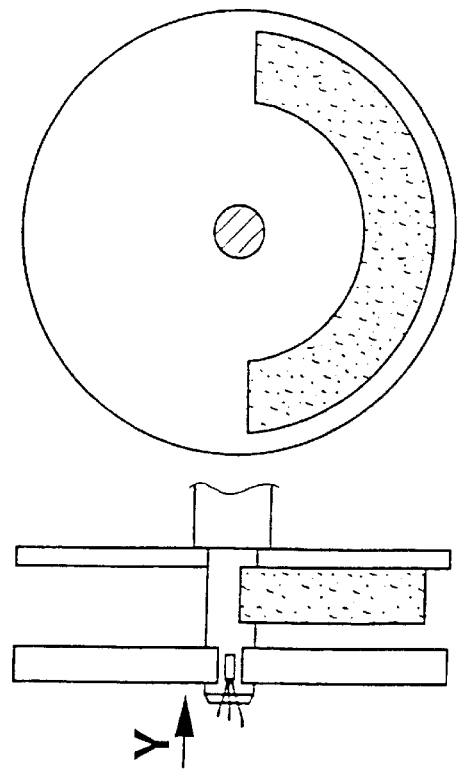

MEASURING DEVICE FOR CONTACTLESS DETECTION OF A ROTATIONAL ANGLE

BACKGROUND OF THE INVENTION

The invention is based on a measuring device for contactless detection of an angle of rotation. German Patent Disclosure Document 196 34 381.3 has disclosed a sensor which is disposed in three planes one above the other. The rotor constitutes the central plane, wherein it is comprised of the supporting plate for a permanent magnet. The supporting plate itself is comprised of a magnetically non-conductive material so that the magnetic flux travels via both the other planes, i.e. the stator, and is controlled with the aid of two spacers that are disposed between the two planes of the stator. The shaft or the extension of a shaft to which the rotor is fastened, has no influence on the magnetic flux. With this sensor, a relatively broad angular range can in fact be measured without a signal reversal, but it is relatively large in terms of the axial direction due to the construction in three parallel planes.

SUMMARY OF THE INVENTION

The measuring device according to the invention for contactless detection of an angle of rotation has the advantage over the prior art that the sensor is relatively small in the axial direction. It is constructed of only two planes. The supporting plate of the permanent magnet, which represents the rotor, is simultaneously also used to convey the magnetic flux. Furthermore, the shaft or the axle on which the rotor sits its included in the conveyance of the magnetic flux, which obviates the need for additional magnetic flux-conducting parts. Furthermore, this construction reduces the number of parts and the assembly cost connected with them.

Due to its simple construction, the sensor can be integrated into various systems with relatively low assembly cost, for example a throttle measuring device or a pedal module for a gas pedal transmitter, or can be used as an independent sensor in throttle valve transmitters or a vehicle body spring deflection device.

BRIEF DESCRIPTION OF THE DRAWINGS

Exemplary embodiments of the invention are represented in the drawings and will be explained in detail in the subsequent description.

FIGS. 1 to 4 show different views of a first exemplary embodiment or sections through it. In this connection, FIG. 1 is a longitudinal section in the view direction X according to FIG. 3, FIG. 2 is a section B—B according to FIG. 4, FIG. 3 is a top view in the view direction Y according to FIG. 1, and FIG. 4 is a longitudinal section in the direction A—A according to FIG. 3.

FIG. 9 shows the corresponding course of the induction B over the rotation angle a.

Figure 10:
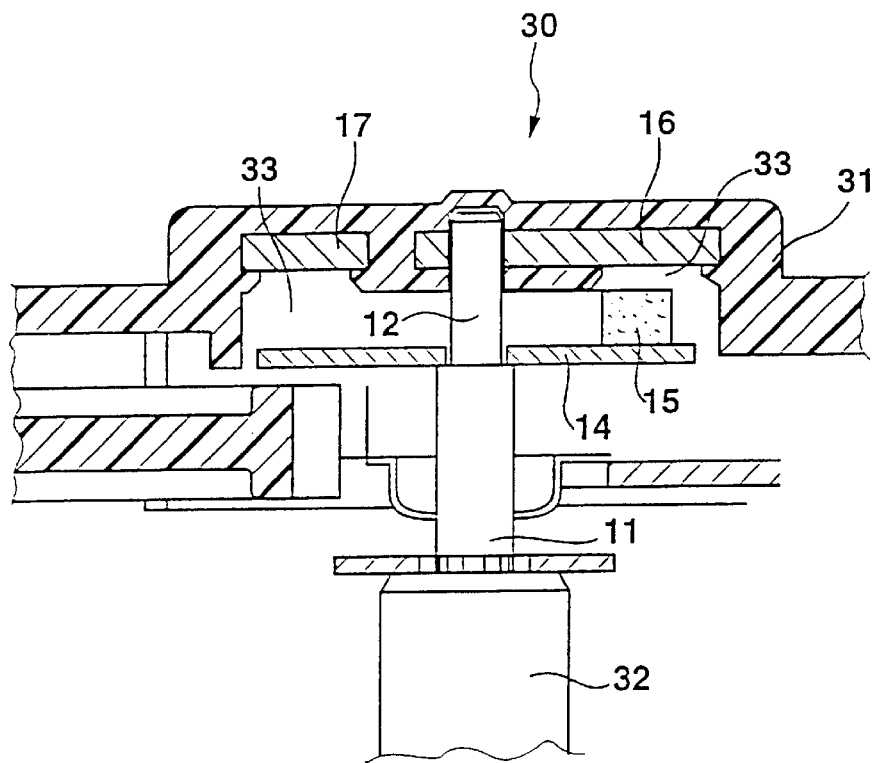
Figure 11:
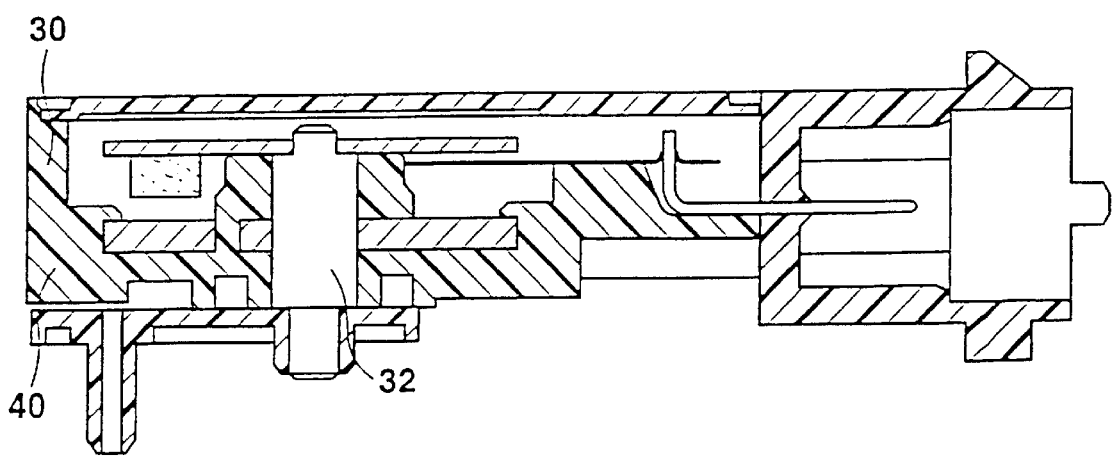

Other exemplary embodiments that represent the sensor being built into a throttle valve adjuster or a pedal transmitter are represented as longitudinal sections in FIGS. 10 and 11.

Figure 12:
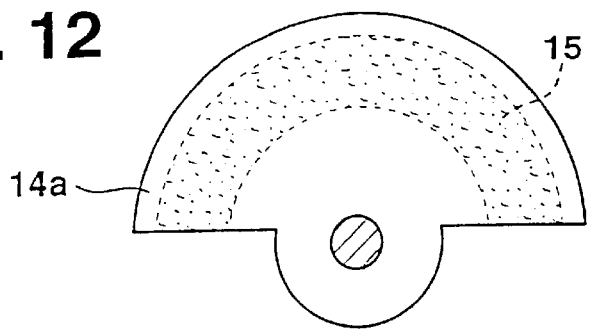
Figure 13:
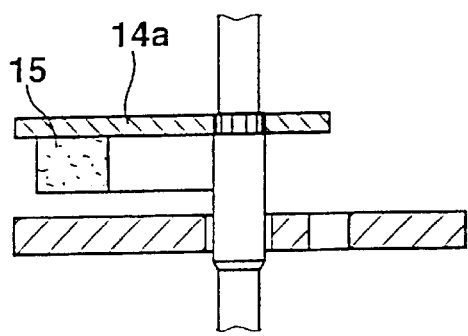
Figure 14:
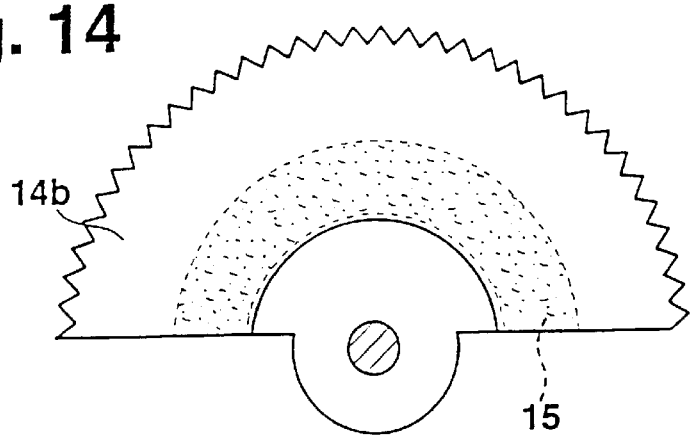
Figure 15:
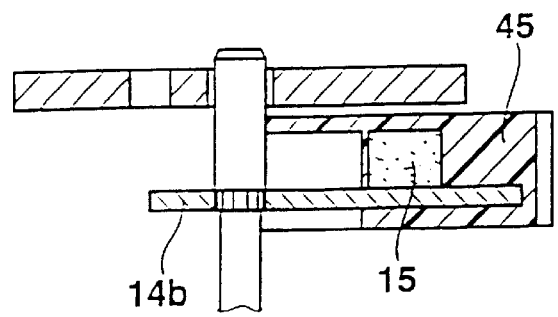
Figure 20:
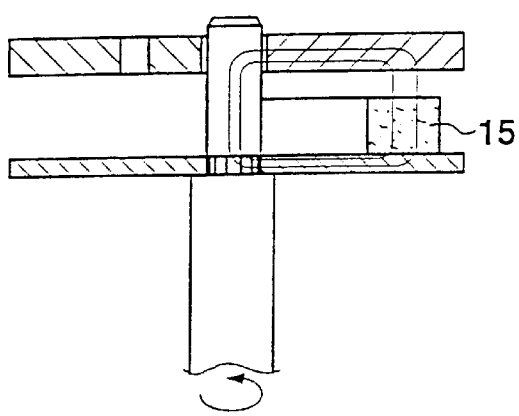
Figure 22:
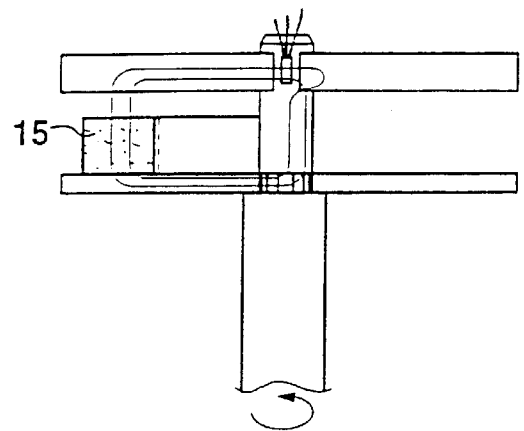
Figure 21:
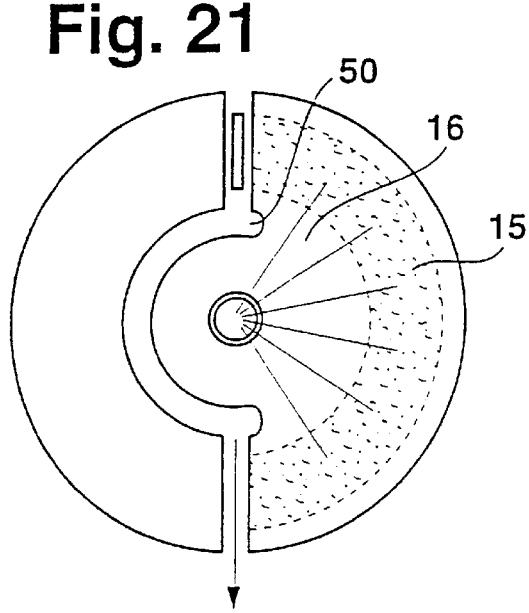
Figure 23:
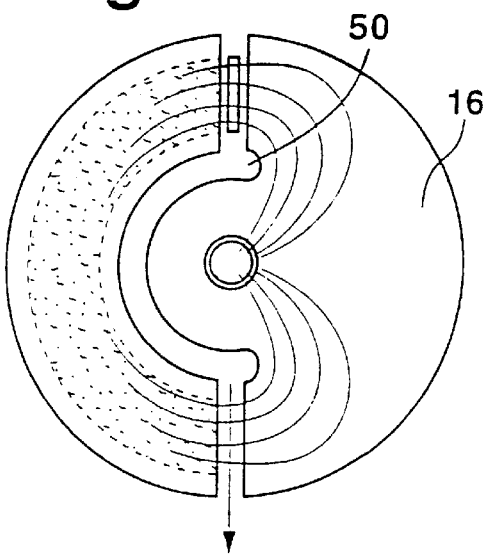

Other exemplary embodiments are shown in a top view in FIGS. 12 and 14 and in a longitudinal section in FIGS. 13 and 15.

The FIGS. 16 to 24 depict different modifications of the exemplary embodiment.

DESCRIPTION OF THE PREFERRED EMBODIMENTS

In FIGS. 1 to 4, a sensor is labeled 10, which with the aid of an axle 11, is connected to a component that is not shown, whose rotational movement is to be detected. An extension 12 is attached to the end face of the axle 11, so that a shoulder 13 is produced, upon which a rotor formed as a supporting plate is centrally placed. The axle 11, the extension 12, and the supporting plate 14 can be produced as individual components or as a single component. An annular permanent magnet 15 is disposed on the supporting plate 14, with as great a radial distance as possible from the center point, ice. from the attachment point of the axle 11. The greater the distance is here, the better the resolution of the measurement signal. The permanent magnet 15 can be embodied as a section of a circle (circle segment) or as part of a circular ring. Its angular range is at least as great as the maximal rotation angle to be detected that belongs to the monitoring or component or the component to be measured. As can be seen from the representations in FIGS. 2 and 3, the angular range of the permanent magnet 15 in this exemplary embodiment is 180° so that a 180° rotation angle to be measured can be achieved. The permanent magnet 15 is furthermore polarized in the axial direction, i.e. perpendicular to the supporting plate 12. The supporting plate 14 is comprised of magnetically conductive, in particular, soft magnetic material. According to the invention, the axle 11 and the extension 12 or at least the extension 12 is also comprised of magnetically conductive, in particular soft magnetic material.

A stator, which is comprised of two segments 16, 17 is disposed in a second plane above the permanent magnet 15, parallel to the supporting plate 14 and spaced slightly apart from it. The segment 16 encloses the extension 12 with an arc 19. In this exemplary embodiment, the arc 19 is embodied as a circular arc. However, a different contour is also conceivable. It is essential, however, that a magnetically conductive connection is possible between the extension 12 and the segment 16. The gap 20 between the axle 11 and the arc 19 must therefore be embodied as small as possible. A continuous gap is formed between the two segments 16, 17 and in the exemplary embodiment according to FIGS. 1 to 4, has two identically embodied outer sections 21 and a central spacer section 22 disposed in the vicinity of the arc 19. With the spacer gap 22, it is important that as little as possible magnetic flux of the magnetic field lines generated by the permanent magnet 15 can exist between the segments 16 and 17, i.e. in this exemplary embodiment in the vicinity of the arc 19. The spacer gap 22 can consequently be filled with air or another magnetically non-conductive material. If the spacer gap 22 is filled with air, then it must be embodied as larger in relation to the gap 21 in order to achieve this above-mentioned effect. Instead of air, a different magnetically non-conductive material can also be selected. A magnetic field sensitive element 25, such as a field plate, a magnetic transistor, coils, a magneto-resistive element, or a Hall element is disposed approximately in the center of the gap 21. It is important here that the magnetic field-sensitive component has as linear as possible a dependency of its output signal on the magnetic induction B. FIGS. 1 to 4 respectively show a measurement with the aid of a single magnetic field-sensitive element 25, a Hall element. However, it would also be possible to dispose for example one element 25 in both gaps 21 in order to be able to carry out a so-called redundant measurement (backup measurement). It would also be conceivable to dispose two elements in one gap. If, as can be seen in FIG. 3, only one magnetic field-sensitive element 25 is disposed in one gap 21, then the opposing gap 21 can also have the size of the spacer gap 22 and can consequently have the magnetically non-conductive function that the spacer gap 22 has. Naturally, it is also possible not only to symmetrically dispose the gap 21 used as the measurement gap, but also to dispose it asymmetrically or even at an angle. It is important here that the gap 21 be embodied as relatively small in relation to the spacer gap 22 in order to permit as uninterrupted as possible a flux of the magnetic lines through the magnetic field-sensitive element 25.

Figure 5:
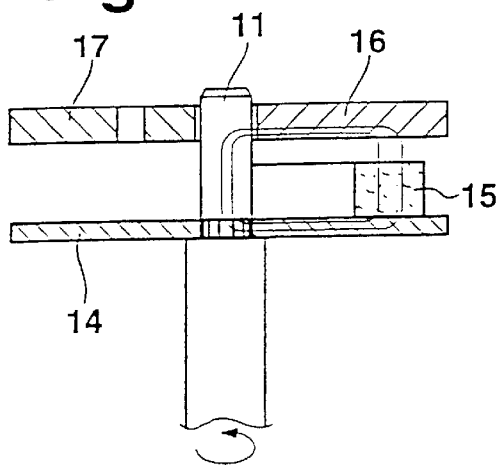
FIGS. 5 and 6 show the magnetic flux at an angular rotation of 0° or an induction of B=0.
Figure 7:
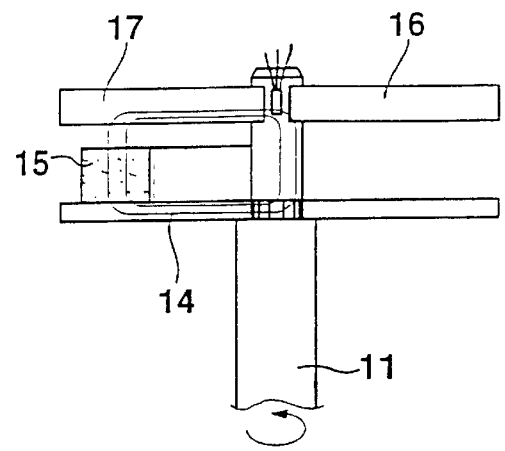
FIGS. 7 and 8 show the corresponding magnetic flux at a maximal angular rotation or at an induction of B=max.
Figure 6:
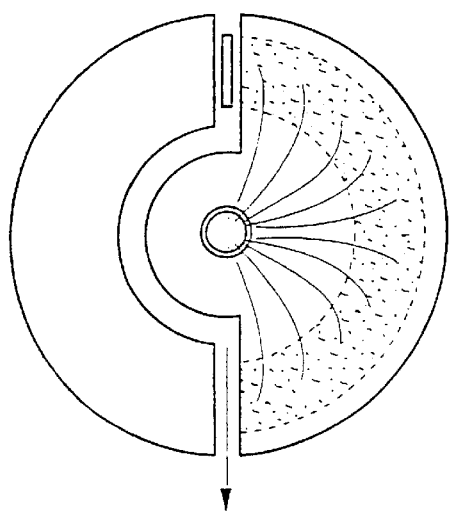
Figure 8:
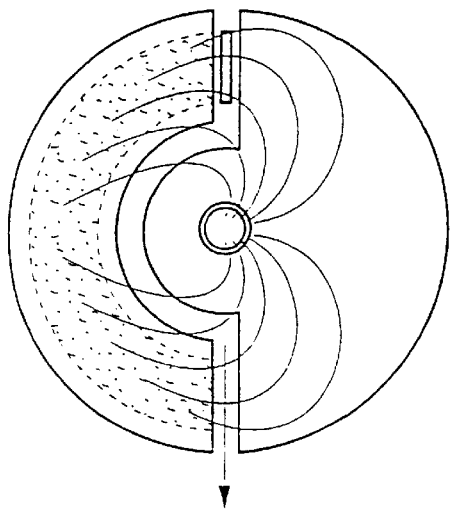
Figure 9:
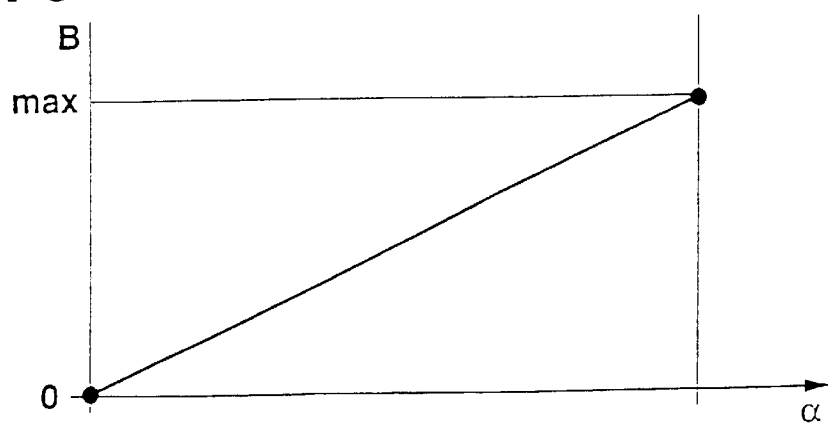

FIG. 9 depicts the course of the characteristic curve of the magnetic induction B in the element 25, e.g. a Hall element, over the rotational angle a of the axle 11. It is clear that a rotational angle α of 0°, the induction B is likewise 0, whereas at the maximal rotational angle α, it also achieves the maximal induction value. In this exemplary embodiment, the maximal rotation angle is achieved at 180°. FIGS. 5 and 6 show the position of the sensor 10 at a rotational angle of 0°. It is clear that the magnetic flux travels from the permanent magnet 15 via the small gap, which serves the mobility of the rotor in relation to the stator, to the segment 16, from there via the small bearing gap to the extension 12, and from their via the supporting plate 14 back to the permanent magnet 15. As is particularly clear from FIG. 6, the magnetic flux is controlled so that a rotation angle of 0°, it does not travel through the element 20 so that no magnetic induction B can occur in the element 25. If the axle 11 and consequently the supporting plate 14 with the permanent magnet 15 is now rotated, then the magnetic flux traveling through the element 25 is increased and the linear and the linear measurement line depicted in FIG. 9 is produced. FIGS. 7 and 8 show the setting at the maximal rotation angle α. FIG. 7 is a view of FIG. 8 in the viewing direction A. In the position of the maximal rotation angle α, the entire magnetic flux of the permanent magnet 15 travels via the small gap into the segment 17. From there, the magnetic flux flows through the one gap 21 into the segment 16 and on the opposite side, flows via the other gap 21 back through the bearing gap into the extension 12 and from there, via the supporting plate 14 to the permanent magnet 15. It is particularly clear from FIG. 8 that when passing the gap 21 almost all of the magnetic flux is conveyed through the element 25 and as a result, a maximal possible magnetic induction B is produced in the element 25. It is also clear from FIG. 8 that the spacer gap 22 produces a course of the magnetic lines almost completely through the gap 21 and consequently through the element 25. As little magnetic flux as possible is permitted via the spacer gap 22.

The exemplary embodiment according to FIG. 10 shows the installation of the above-described sensor in a throttle valve adjusting unit 30. With the aid of this unit 30, the rotation angle of a throttle valve is detected for a motor control. In this connection, the segments 16, 17 of the stator are disposed directly in the cover 31 of the throttle valve adjusting unit 30. Since the cover 31 is comprised of plastic, the segments 16, 17 can be injection-molded into the cover 31. However, it would also be possible to clip the two segments 16, 17 of the stator into the cover 31. Naturally, there must be a gap 33, however, which permits a magnetic flux from the permanent magnet 15 to the segments 16 and 17. One or both of the elements 25 are in turn disposed in a gap 33, which is not visible in FIG. 10. The axle 11 in this connection is fastened directly to the shaft 32 of the throttle valve or represents an extension of this shaft 32. The supporting plate 14 with the permanent magnet 15, which plate is used as a rotor, is consequently fastened directly to the shaft 32 of the throttle valve. Without great changes, the sensor according to FIGS. 1 to 4 or 12 to 15 can be built into a throttle valve adjusting unit 30. In this connection, the previously used potentiometer, for example, can be simply replaced. FIG. 11 depicts a pedal transmitter. In FIG. 11, the segments 16, 17 of the stator are disposed in the bottom 40 of the unit 30a. The segments 16, 17 here can once again be injection-molded or clipped into the bottom 40. The extension of the shaft 32 consequently protrudes through the stator, and the supporting plate 14 that is used as a rotor is fastened to the end of the axle 32. Consequently, according to FIGS. 10 and 11, the sensor corresponding to the embodiments of FIGS. 1 to 4 or 12 to 15 can be adapted to the structural conditions of the throttle valve adjusting unit 30 or the pedal transmitter.

In the exemplary embodiment according to FIGS. 12 and 13, the supporting plate of the sensor is no longer a full disk. It is sufficient for the supporting plate 14a to be embodied as a segment that has an angular range which corresponds to the size of the permanent magnet 15. FIG. 12, with reference to FIGS. 1 to 4, shows a permanent magnet with an angular range of 180°. Consequently, the supporting plate 14a also has an angular range of approximately 180°. The outer contour of this supporting disk 14a, which is embodied as a segment, can be embodied arbitrarily. So for example in FIGS. 14 and 15, the supporting segment 14b is embodied as a gear segment. As can be seen particularly in FIG. 15, the gear segment 45 is injection-molded onto the supporting disk 14b, wherein the gear segment 45 also encompasses the permanent magnet 15. With the aid of the gear segment, which is made of magnetically non-conductive material, a driving force can be simultaneously introduced into the supporting plate. This permits an integration into a drive device and consequently, a very compact construction.

In the exemplary embodiment according to FIGS. 16 to 19, a recess 50 is embodied at each of the transitions from the gap 22 into the two gaps 21. The recesses 50 in this connection represent an elongation of the gap 22, which protrudes into the segment 16 of the stator. FIG. 18 depicts the recesses 50 as arc-shaped, but a different form is also conceivable. It is important here that the recesses 50 protrude at least 15° into the segment 16. With an arc-shaped embodiment, the side edges of the recess 50 represent an elongation of the gap 22, which is enclosed with a circular arc. The recesses 50 hinder the magnetic stray flux of the permanent magnet 15 to a relatively large degree. As result, the stray flux at the transition from the gap 22 to the two gaps 21 is minimized, which further improves the output signal in its linearity. As result of the recesses 50, it is possible to reduce the size of the gap 22 used as a spacer gap in comparison to the exemplary embodiments above and consequently, to reduce the size of the sensor. In order to achieve an optimal use of the magnetic flux, the area of the segments 16 and 17, which are disposed opposite one another in the vicinity of the two gaps 21, should be virtually equal. Like the gap 22 in this exemplary embodiment or in the previous ones, the recesses 50 should be filled with air or, as a magnetically non-conductive spacer, should be filled with a corresponding material compound. It is important for the size ratio between the gap 21, the gap 22, and the recess 50 that the gap 22 and the recesses 50 are much larger in proportion than the two gaps 21 so that no magnetic flux of the permanent magnet 15 is possible via the gap 22 and the recesses 50 and consequently, this magnetic flux travels almost completely via the two gaps 21. As shown in FIG. 18 and mentioned in the previous exemplary embodiments, it is possible that there is only one magnetic field-sensitive element 25 in one gap 21. In this connection, it is conceivable to embody the diametrically opposing gap on the same order of magnitude as a gap 21 with the magnetic field-sensitive element 25. However, it is also conceivable to embody this gap 21, which is not filled with a magnetic field-sensitive element 25, on the order of magnitude of the gap 22 and consequently to embody it as a spacer gap. As mentioned above, it can in this case have the order of magnitude of the gap 22 and/or can additionally be filled with magnetically non-conductive material or air. In the FIGS., the gap 21 with the magnetic field-sensitive element 25 is depicted as a gap that extends radially outward. However, it would also be conceivable for this measurement gap to be embodied as angled or asymmetrical.

In FIGS. 20 to 23, the magnetic flux is now shown at the rotation angle positions α=0 degrees and α= the maximal rotation angle corresponding to the FIGS. 5 to 9. It is clear from FIGS. 20 and 21 that as a result of the recesses 50, the magnetic flux of the permanent magnet 15 into the inside of the segment 16 is also prevented so that at the angle position α=0 degrees, the induction B is likewise zero and is hardly tainted by any stray flux. However in FIGS. 22 and 23, the maximal induction value B=Max is also achieved at the maximal rotation angle α. As a result of the recesses 50, a stray flux is also prevented here which would bypass the magnetic field-sensitive element 25.

Figure 24:
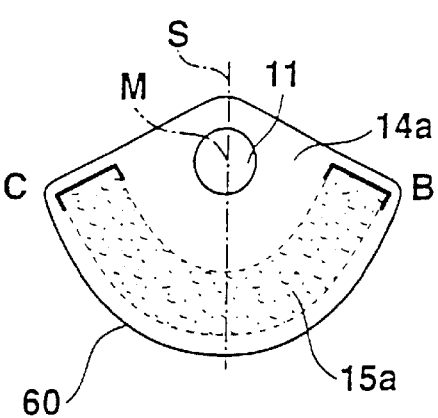

Consequently, virtually all of the magnetic flux is conveyed via the magnetic field-sensitive elements. FIG. 24 shows a modification of the rotor 14a. Due to the geometry of the rotor 14a, the linearity of the characteristic curve of the sensor over the measurement range of 140 degrees is significantly improved. The magnetic stray flux of the permanent magnet 15a is minimized and as a result, the zero point of the measurement curve of the sensor has a high degree of temperature stability. As is clear from FIG. 24, the rotor 14a represents a circular segment which in contrast to the rotor 14 of the previous exemplary embodiments, has an angle of <180°. The rotor 14a in this connection must encompass the axle 11. The circular section 60 of the rotor 14a, which lies between the points C and B, has its center point in the center point M of the shaft 11. Furthermore, a line S extends through the center point M. The rotor 14a is embodied as mirror-inverted in relation to this line S. This means that a connection of the point C to a point A, which lies on the line S, and a connection of the point B to this point A each have the same angle in relation to the line S. The point A his disposed on the side of the rotor 14a opposite from the circular arc shape 60. In the vicinity of the points A, B, and C, the rotor 14a must have rounded edges. The magnitude of the angle of the rotor 14a depends on the magnet segment 15a that is used. The assurance must be made that the angular range of the rotor 14a is equal to or greater than that of the magnet used.

What is claimed is:

1. A measuring device for contactless detection of an angle of rotation a between a stator (16, 17) and a rotor (14), wherein a permanent magnet (13) is disposed on the rotor (14), wherein there is an air gap between the stator (16, 17) and rotor (14) and the stator is comprised of at least two segments (16, 17), which are separated by at least one magnetically non-conductive gap (21, 22), wherein at least one magnetic field-sensitive element (25) is disposed in at least one gap (21), wherein at least one part (17) of the stator has no magnetically conductive connection to the rotor (14), characterized in that the axle (11) of the rotor (14) has at least one region made of magnetically conductive material which extends at least from the rotor (14) to the part (16) of the stator and has a magnetically conductive connection to the rotor (14), and in that there is at least one first gap (22) between the two parts (16, 17) of the stator, which hinders the magnetic flux of the permanent magnet (15) and controls it so that it travels via at least one of the other gaps (21).

2. The measuring device according to claim 1, characterized in that the first gap (22) is larger than the other gap (21).

3. The measuring device according to claim 1, characterized in that the shaft (11), in particular the extension (12), and the rotor (14) are comprised of a soft magnetic material.

4. The measuring device according to claim 1, characterized in that a part (16) of the stator has an extension (19) into which the axle (11), particularly its extension (12), protrudes.

5. The measuring device according to claim 4, characterized in that the extension (19) of the part (16) of the stator is embodied as arc-shaped.

6. The measuring device according to claim 1, characterized in that the rotor and the stator are embodied in the form of disks.

7. The measuring device according to claim 1, characterized in that the rotor is embodied as a segment.

8. The measuring device according to claims 1 to 7, characterized in that there are two other gaps (21) and at least one magnetic-field sensitive element (25) is disposed in each of them.

9. The measuring device according to claim 1, characterized in that the axle (11) and the rotor (14) are embodied of one piece.

10. The measuring device according to claim 1, characterized in that at least one recess (50) is embodied at the transition from the first gap (21) to the other gap (22) in the part (16) of the stator.

11. The measuring device according to claim 1, characterized in that the first gap (22), the other gap (21), and the recess (50) are filled with air or with a magnetically non-conductive material.

12. The measuring device according to claim 1, characterized in that the at least one recess (50) has a penetration depth of $\geq 15°$.

13. The measuring device according to claim 1, characterized in that the width of the other gap (21) is less than the width of the recess (50).

14. The measuring device according to claim 1, characterized in that the width of the recess (50) corresponds to the width of the first gap (22).

15. The measuring device according to claims 1 to 14, characterized in that the recess (50) is enclosed with a circular arc.

16. The measuring device according to claim 1, characterized in that there is another gap (21) with at least one magnetic field-sensitive element (25), and the remaining gap (22), which is disposed between the two parts (16, 17) of the stator, is embodied as larger than the other gap (21).

17. The measuring device according to claim 1, characterized in that there is a first recess (50) at the transition from the other gap (21) to the gap (22), and that a second recess (50) is embodied, which is disposed diametrically opposite it.

18. The measuring device according to claim 1, characterized in that the other gap (21) is embodied as angled or asymmetrical.

19. The measuring device according to claim 1, characterized in that the rotor (14a) represents a circular segment, which encompasses the axle (11).

20. The measuring device according to claim 1, characterized in that the rotor (14a), which is embodied as a circular segment, has an angle that is greater than or equal to that of the permanent magnet (15a).

21. The measuring device according to claim 1, characterized in that the circular segment has a circular outer contour (60) whose center point is disposed in the center point M of the axle (11) and that the circular segment is embodied as axially symmetrical to a line (S) running through the center point M of the axle (11).

22. The measuring device according to claim 1, characterized in that the circular segment (14a) has two straight edges.

23. The measuring device according to claim 1, characterized in that the transitions of the edges of the rotor (14a) between each other and the edges to the circular outer contour (60) are rounded.

24. A throttle valve sensor or pedal transmitter with a measuring device according to claim 1, characterized in that the part being used as the stator (16, 17) is integrated into the cover (31) of the sensor (30) and that the cover (31) is comprised of plastic.

25. A throttle valve sensor or pedal transmitter with a measuring device according to claim 1, characterized in that the part being used as the stator (16, 17) is integrated into the bottom (40) of the sensor (30) and that the bottom (40) is comprised of plastic.

* * * * *